United States Patent [19]

Eckardt et al.

[11] Patent Number: 5,023,403

[45] Date of Patent: Jun. 11, 1991

[54] DEVICE FOR CONNECTING AN ELECTRICAL CABLE TO A WINDOW PANE HAVING ELECTRICAL CONDUCTORS

[75] Inventors: Rudolf Eckardt, Wesel; Bernd Diedrichs, Hamminkeln, both of Fed. Rep. of Germany

[73] Assignee: Flachglas Aktiengesellschaft, Furth, Fed. Rep. of Germany

[21] Appl. No.: 451,346

[22] Filed: Dec. 15, 1989

[30] Foreign Application Priority Data

Dec. 21, 1988 [DE] Fed. Rep. of Germany ... 8815848[U]

[51] Int. Cl.$^5$ ............................................. H01R 11/01
[52] U.S. Cl. ................................. 174/94 R; 219/203;
219/541; 340/550; 439/874
[58] Field of Search ....................... 174/94 R; 340/550;
439/874, 876; 219/507, 541, 203

[56] References Cited

U.S. PATENT DOCUMENTS

| 2,600,485 | 6/1952 | Cox | 439/874 |
|---|---|---|---|
| 2,972,657 | 2/1961 | Stemke | 174/94 R |
| 3,549,785 | 12/1970 | Timko, Jr. et al. | 219/203 X |
| 3,566,008 | 2/1971 | Ettlinger | 174/94 R |
| 3,643,756 | 2/1972 | Soreghy | 340/550 |
| 4,394,533 | 7/1983 | Naito | 439/874 X |
| 4,692,744 | 9/1987 | Hickman | 340/550 |
| 4,719,317 | 1/1988 | Reynolds et al. | 174/94 R |
| 4,804,946 | 2/1989 | Elkowitz | 340/550 |

FOREIGN PATENT DOCUMENTS

| 1134802 | 8/1962 | Fed. Rep. of Germany . |
| 1300039 | 7/1969 | Fed. Rep. of Germany . |
| 1923311 | 8/1972 | Fed. Rep. of Germany . |

Primary Examiner—Morris H. Nimmo
Attorney, Agent, or Firm—Herbert Dubno

[57] ABSTRACT

A flexible connection is made between the printed conductor array of an automotive windshield or rear window and an electric cable by a braided body formed with a lug at one end for connection to the cable and having, at the opposite end, oppositely bent arms or feet in the form of arms of a T soldered to the conductor array only at the extremity of these feet.

8 Claims, 2 Drawing Sheets

DEVICE FOR CONNECTING AN ELECTRICAL CABLE TO A WINDOW PANE HAVING ELECTRICAL CONDUCTORS

FIELD OF THE INVENTION

The present invention relates to a device for connecting a window pane, especially an automotive windshield for a rear window provided with electrical conductors to an electric cable making an electrical connection between the cable and the conductors on the window pane.

BACKGROUND OF THE INVENTION

It is known to provide the glass panes, especially the window panes of automotive vehicles, and particularly safety glass panes which may have a composite or sandwich construction and may consist of two glass sheets joined together, with electrical conductors for a variety of purposes. The conductors may be strips imprinted on one or another of the glass sheets or embedded in the composite structure, wires embedded in the glass or between the glass sheets, or the like.

The conductors can be used for the heating of the window pane, e.g. for deicing, defrosting or removal of moisture. Alternatively, the conductors may form an antenna operating at radio frequencies.

In the past a variety of ways of connecting such conductors to an electrical system of the vehicle or to the radio unit have been employed. For example, a solder element may be provided along the edge of the conductor pattern on the glass pane and can have lugs onto which the lugs of an electrical cable can be plugged. The term "cable" is here used especially to refer to an insulated conductor for the low-current electrical system of a vehicle or for a radio connection or the like.

In one conventional construction utilizing these principles, the solder pad is constituted as a bridge-like sheet metal element which can be composed of a copper alloy or of a similar material and only the feet of the bridge are soldered to the conductor array on the pane. A system of this type is disclosed, for example, in German patent 13 00 039.

Between the feet of the bridge, a bridge span or stirrup is formed which constitutes an elastic or elastically deformable or plastically deformable compensating element capable of yielding with changes in the dimensions of the glass pane and the system to which the glass pane is connected as a result of thermal contraction and expansion.

A connecting lug is formed on the bridge piece and can constitute a plug lug of the type onto which a spade lug can be fitted.

While this construction has been found to be effective to maintain the requisite electrical connection in spite of varying thermal expansion and contraction conditions and deformations which occur at low velocities, when the assembly is subjected to sudden stresses, it is possible for the solder junctions to rupture. This can occur, for example when a cable shoe is applied, when the spade lug is removed or some other maintenance or assembly force is applied.

The stresses which are capable of rupturing the solder junction can also arise during operation as a result of dynamic stresses which are not uncommon in automotive vehicles.

OBJECTS OF THE INVENTION

It is, therefore, the principal object of the present invention to provide an assembly for the aforedescribed purposes, namely, the connection of the conductor array of a window pane to an electrical cable, whereby the aforedescribed drawbacks are avoided.

Another object of this invention is to provide an improved connecting assembly which avoids the problem of uncontrolled solder junction rupture and whereby the electrical connection can withstand highly sudden mechanical stresses as well as the varying thermal expansion and contraction movements which may occur between the glass pane and the parts connected therewith.

It is also an object of this invention to provide an electrical connection to the conductor array of a window pane, especially for an automotive glass pane whereby drawbacks of earlier systems are avoided.

SUMMARY OF THE INVENTION

These objects and others which will become apparent hereinafter are attained, in accordance with the invention by providing the solder junction between a conductor element having two braid feet which derive from a central braid body bent from the latter like the arms of a T and connected at opposite ends of the conductor array.

The other end of the braid body is provided with a lug which can be connected to the cable as a plug-type lug or in some other manner.

The term "braid" is used here in the sense that is common in electrical technology for braided conductors.

The soldered portions of the braided member, are, of course, flexible and the braid body extending between the soldered arms of the T and the lug is likewise of a highly flexible nature capable of withstanding the thermal expansion and contraction phenomena to which the connection may be subject as well as mechanical stresses which are slow acting or sudden.

The connection of the lug with the braid body can be effected in any conventional way, e.g. by soldering.

Of course, the ends of the surfaces to be soldered may be, "tinned" or provided with solder layers before the parts are soldered together to facilitate soldering.

Mention may be made of the fact that from German patent 11 34 802, for example, glass panes provided with electrical resistance wires may be connected with the current supply line by a bendable braid structure having braided arms in a star pattern.

It may also be mentioned that German patent 19 23 311 describes similar glass panes with conductors utilizing metal braid. However, in neither of these latter cases is a system described which is applicable to the problems arising with the system of German patent document 13 00 039.

According to a feature of the invention, the braided feet have a length of about 8 mm and a width, for the solder junction as measured transversely or orthogonal thereto, of about 4 mm or less.

The braid body can be a one-piece braid structure extending from the lug to the feet and divided only at the feet. It is also possible in accordance with the invention to provide the braid body in two parallel braid segments from each of which one the of the braided feet is bent at a right angle. The braid body should have a length between feet and the lug of 10 to 100 mm.

The braid segment may also be provided, if desired, with an insulated sheath.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
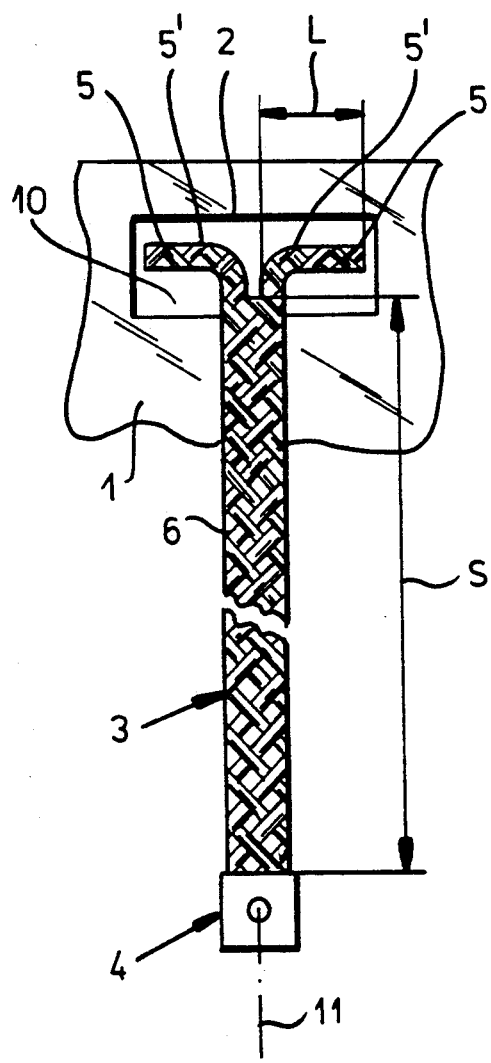
FIG. 1 is a plan view of the connecting device of the invention in accordance with one embodiment thereof.

FIG. 1 shows a glass pane 1 which can be provided with an array of conductors as is conventional in the art and can be a windshield or rear window, for example, of an automotive vehicle onto which the electrical conductors have been printed for use in defrosting, as an antenna or both. A so-called solder window 2 is provided on the glass pane and the connection is made to the conductive array 10 to this window by a solder connecting element generally designated at 3 and a plug-type lug 4. The lug 4 can be connected to a cable as represented diagrammatically at 11.

Figure 2:
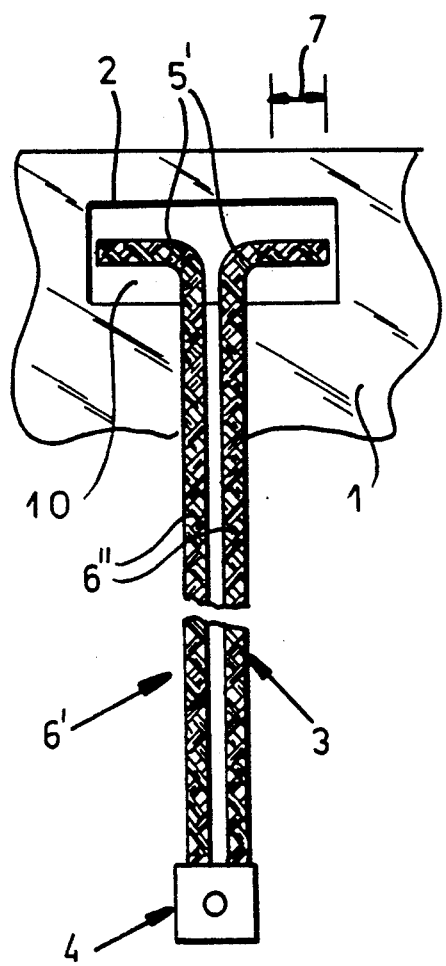
FIG. 2 is a similar view of a second embodiment.

Member 3 is intended to be soldered to the conductor array along an edge of the glass pane and the portion of this array visible in FIGS. 1 and 2 has been shown at 10.

The lug 4 can be plugged onto a cable shoe of conventional design. If desired, the lug 4 can be replaced by an eye.

Member 3 is formed with two braided feet 5 which are bent at right angles from a central braid body 6 in the configuration of arms of a T. The lug 4 is soldered onto the opposite end of the braid body 6. The arms T have lengths L of about 10 mm. Solder (not seen in FIGS. 1 and 2) is applied over a length as represented by the arrow 7 at the ends of the arms of 4 mm or less. The solder regions thus encompass the ends of the feet 5. The ends of the feet 5 may be previously "tinned" with solder so that during the soldering operation, solder does not flow to the bends 5' or into the central region or body 6 so that the body remains fully flexible and does not provide a rigid bridge.

In the embodiment shown in FIG. 1, the braid body 6 is a one-piece structure. Only in the region of the feet 5 is this body defined.

In the embodiment of FIG. 2, the body 6' comprises two braid elements 6" which extend parallel to one another and are formed with the respective braid feet 5'.

Figure 3:
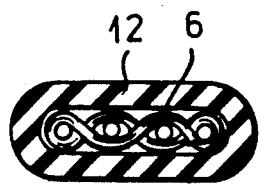
FIG. 3 is a cross sectional view through the braid body showing the application of an insulating sheath thereto.

In the embodiment of FIG. 3, the braid body 6 is shown to be surrounded by an electrically insulating sheath 12 which does not interfere with the flexibility of this member and can extend over all or part of the length of the body between the lug and the region at which the arms 5 are bent at right angles thereto.

Figure 4:
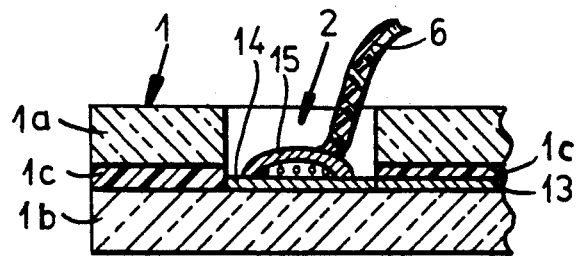
FIG. 4 is a diagrammatic cross sectional view illustrating principles of the invention.

In FIG. 4, the solder window 2 is shown to be provided. A glass sheet 1a of the pane 1 forms a composite with a second pane 1b, a synthetic resin film 1c being interposed between the panes. The conductors are printed on an inner surface of the pane 1b as shown at 13 and branch from a conductive strip 14 to which the foot 5 of a braid body 6 is soldered. The solder penetrates the braid and is visible in FIG. 4 only as a film of solder 15 overlying the soldered region.

Figure 5:
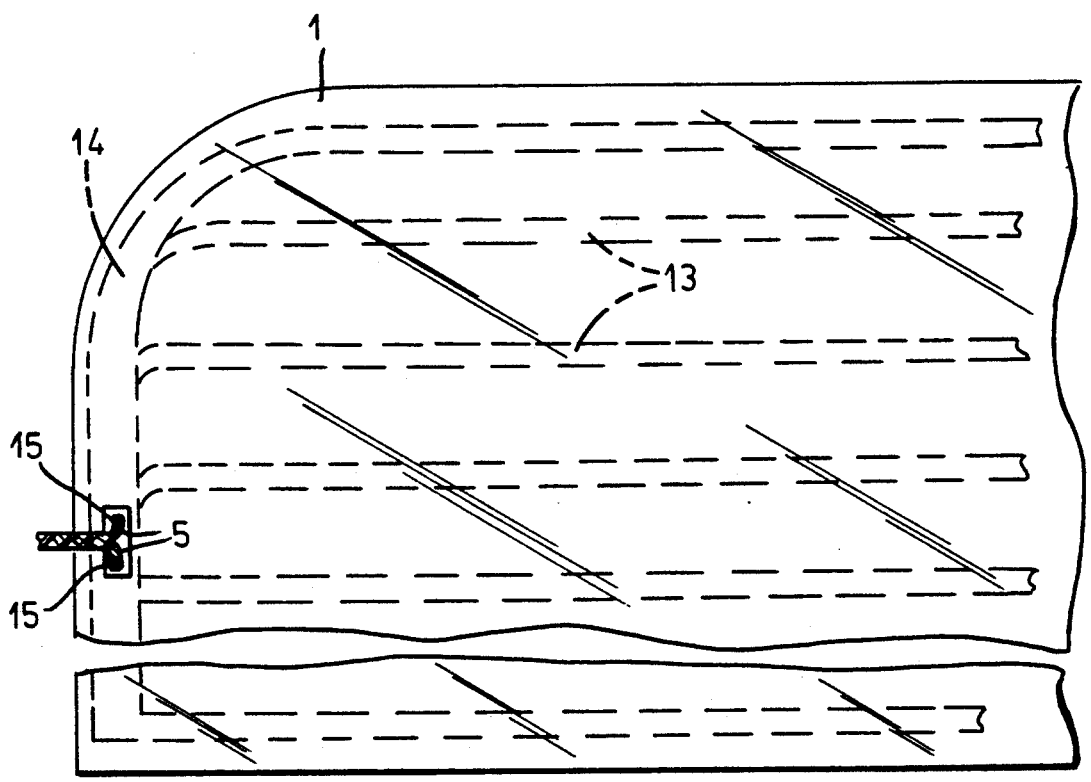
FIG. 5 is an elevational view of a window pane provided with a conductor assembly with which the connecting assembly of the invention may be used.

In FIG. 5, the pane 1 has been shown in greater detail and the conductive strip 14 and the branches 13 are also visible. Note that the solder regions 15 encompass only the very ends of the braided feet 5.

Figure 6:
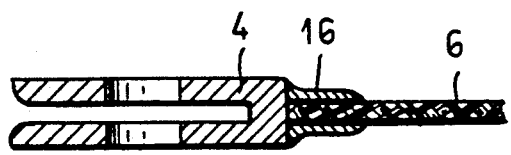
FIG. 6 is a cross section through the connecting lug of the invention.

In FIG. 6 there is shown a solder junction 16 between the braid body 6 and the lug 4. Any other lug connection suitable for use with braided conductors may be employed as well.

When the sheath 12 is employed, it may be a heat-shrink tube which can surround both of the elements 6" in the embodiment of FIG. 2. The elements 6" may also be soldered to one another along their lengths, e.g. by points of solder.

In both embodiments, the length S of the braided body may be 10 to 100 mm.

What is claimed is:

1. A connecting assembly for connecting at least one conductive element on a window pane to an electrical cable, comprising:
    an elongated braided body extending between a conductive element and a cable, said body being formed at one end with a pair of braided feet bent at a right angle to said body and forming arms of a T therewith;
    means forming a solder junction between ends of said feet and said element; and
    a lug connected to said body at an extremity thereof opposite said feet, for electrical connection to said cable.

2. The assembly defined in claim 1 wherein said feet have lengths of substantially 8 to 10 mm.

3. The assembly defined in claim 2 wherein said body comprises a single braided structure extending from said lug to said feet and divided where said feet branch from said body.

4. The assembly defined in claim 2 wherein said body comprises two mutually parallel braided parts each of which is formed with a respective one of said feet.

5. The assembly defined in claim 2 wherein said body has a length of 10 to 100 mm.

6. The assembly defined in claim 5 wherein substantially only at most 4 mm of each of said feet is soldered to said element.

7. The assembly defined in claim 6 wherein said lug is soldered to said body.

8. The assembly defined in claim 7 wherein said element is part of a printed conductor array of said window pane and said pane is automotive glass.

* * * * *